(12) United States Patent
Chang et al.

(10) Patent No.: US 12,253,756 B2
(45) Date of Patent: Mar. 18, 2025

(54) ELECTRONIC DEVICE

(71) Applicant: InnoLux Corporation, Miao-Li County (TW)

(72) Inventors: Kuei-Sheng Chang, Miao-Li County (TW); Kuo-Jung Wu, Miao-Li County (TW); Po-Yang Chen, Miao-Li County (TW); I-An Yao, Miao-Li County (TW)

(73) Assignee: InnoLux Corporation, Miao-Li County (TW)

( * ) Notice: Subject to any disclaimer, the term of this patent is extended or adjusted under 35 U.S.C. 154(b) by 0 days.

(21) Appl. No.: 18/427,845

(22) Filed: Jan. 31, 2024

(65) Prior Publication Data

US 2024/0168329 A1    May 23, 2024

Related U.S. Application Data

(63) Continuation of application No. 18/109,841, filed on Feb. 14, 2023, now Pat. No. 11,921,372, which is a continuation of application No. 17/548,612, filed on Dec. 13, 2021, now Pat. No. 11,604,382.

(30) Foreign Application Priority Data

Jan. 11, 2021    (CN) .......................... 202110033658.2

(51) Int. Cl.
*G02F 1/00*      (2006.01)
*G02F 1/13357*   (2006.01)

(52) U.S. Cl.
CPC .. *G02F 1/133603* (2013.01); *G02F 1/133606* (2013.01)

(58) Field of Classification Search
None
See application file for complete search history.

(56) References Cited

U.S. PATENT DOCUMENTS

| | | | |
|---|---|---|---|
| 2018/0260602 A1* | 9/2018 | He ....................... | A61B 5/0075 |
| 2022/0308382 A1* | 9/2022 | Zhang ................. | G02F 1/13338 |
| 2024/0053522 A1* | 2/2024 | Acharya ................ | G06V 40/13 |

FOREIGN PATENT DOCUMENTS

| | | |
|---|---|---|
| CN | 110088673 A | 8/2019 |
| TW | M601851 U | 9/2020 |
| WO | 2019/071560 A1 | 4/2019 |

* cited by examiner

*Primary Examiner* — Gerald J Sufleta, II
(74) *Attorney, Agent, or Firm* — Winston Hsu

(57) ABSTRACT

An electronic device including a first light emitting unit, a second light emitting unit, a first optical layer and a second optical layer is disclosed. The first light emitting unit emits a first light. The second light emitting unit emits a second light. At least one of the first light and the second light passes through the first optical layer. The second optical layer is overlapped with the first optical layer. The second optical layer is configured to scatter the first light emitted from the first light emitting unit. When the first light emitting unit emits the first light, the second light emitting unit selectively emits the second light.

9 Claims, 7 Drawing Sheets

ELECTRONIC DEVICE

CROSS REFERENCE TO RELATED APPLICATIONS

This application is a continuation application of U.S. application Ser. No. 18/109,841, filed on Feb. 14, 2023, which is a continuation application of U.S. application Ser. No. 17/548,612, filed on Dec. 13, 2021. The contents of these applications are incorporated herein by reference.

BACKGROUND OF THE DISCLOSURE

1. Field of the Disclosure

The present disclosure relates to a backlight module, and more particularly to a backlight module including different light emitting units and a display device using the same.

2. Description of the Prior Art

With the technical development of electronic products, the function of fingerprint identification are integrated in various electronic products and widely used. Taking a display device such as a smart phone as an example, the user does not need to memorize passwords and can directly manage the display device through fingerprint identification, and the fingerprint identification process is fast and it is not easy to counterfeit fingerprint, so fingerprint identification can provide good convenience or security.

However, in the current display device combined with fingerprint identification function, the light generated by the backlight module includes too much stray light for fingerprint identification, which leads to poor fingerprint imaging and poor fingerprint identification effect.

SUMMARY OF THE DISCLOSURE

One of the objectives of the present disclosure is to provide a backlight module and a display device using the same, which have good fingerprint identification effect and display quality.

An embodiment of the present disclosure provides an electronic device. The electronic device includes a first light emitting unit, a second light emitting unit, a first optical layer and a second optical layer. The first light emitting unit emits a first light. The second light emitting unit emits a second light. At least one of the first light and the second light passes through the first optical layer. The second optical layer is overlapped with the first optical layer. The second optical layer is configured to scatter the first light emitted from the first light emitting unit. When the first light emitting unit emits the first light, the second light emitting unit selectively emits the second light.

These and other objectives of the present disclosure will no doubt become obvious to those of ordinary skill in the art after reading the following detailed description of the embodiment that is illustrated in the various figures and drawings.

DETAILED DESCRIPTION

Figure 1A:
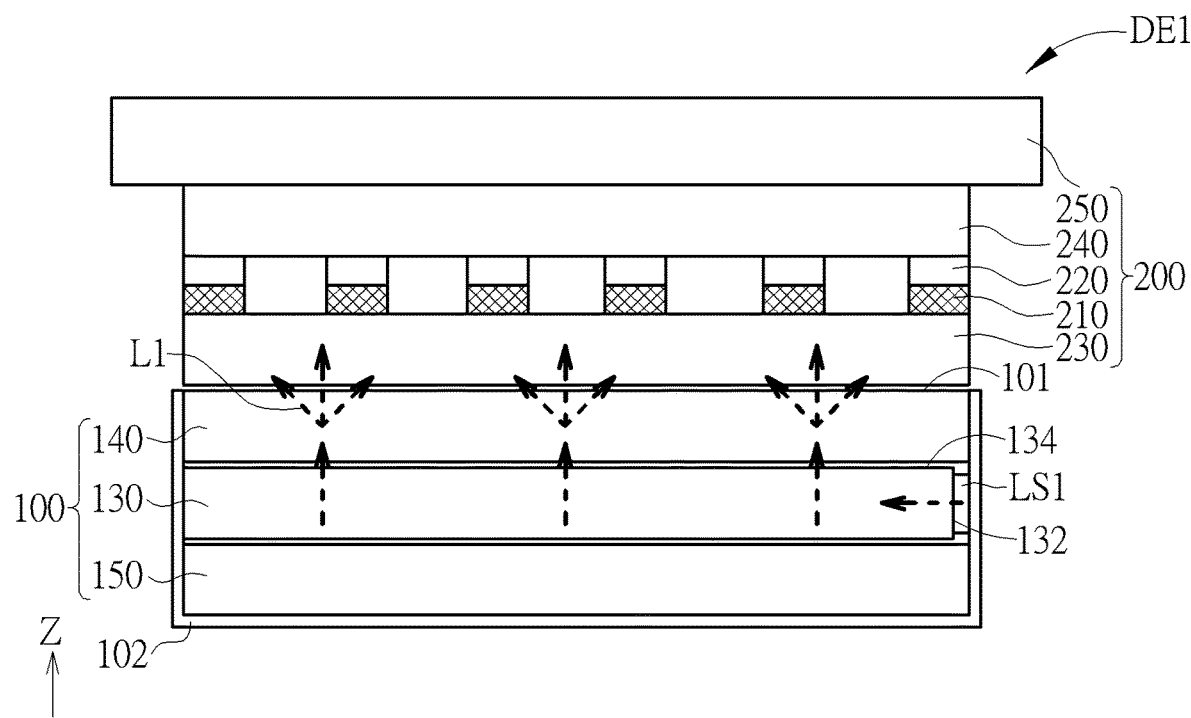
FIG. 1A is a schematic diagram of a backlight module in a first mode and a display device in a display mode according to a first embodiment of the present disclosure.

The present disclosure may be understood by reference to the following detailed description, taken in conjunction with the drawings as described below. It is noted that, for purposes of illustrative clarity and being easily understood by the readers, various drawings of this disclosure show a portion of the device or the structure, and certain components in various drawings may not be drawn to scale. In addition, the number and dimension of each component shown in drawings are only illustrative and are not intended to limit the scope of the present disclosure.

Certain terms are used throughout the description and following claims to refer to particular components. As one skilled in the art will understand, electronic equipment manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". When the terms "include", "comprise" and/or "have" are used in the description of the present disclosure, the corresponding features, areas, steps, operations and/or components would be pointed to existence, but not limited to the existence or addition of one or a plurality of the corresponding or other features, areas, steps, operations and/or components.

The directional terms mentioned in this document, such as "up", "down", "front", "back", "left", "right", etc., are only directions referring to the drawings. Therefore, the directional terms used are for illustration, not for limitation of the present disclosure. In the drawings, each drawing shows the general characteristics of methods, structures and/or materials used in specific embodiments. However, these drawings should not be interpreted as defining or limiting the scope or nature covered by these embodiments. For example, the relative size, thickness and position of each layer, region and/or structure may be reduced or enlarged for clarity.

When a component or layer is referred to as being "on" or "connected to" another component or layer, it may be directly on or directly connected to the other component or layer, or intervening components or layers may be presented (indirect condition). In contrast, when a component or layer is referred to as being "directly on" or "directly connected to" another component or layer, there are no intervening components or layers presented.

The terms "about", "around", "approximately" and "substantially" mentioned in this document generally mean being within 20% of a given value or range, or being within 10%, 5%, 3%, 2%, 1% or 0.5% of a given value or range. The given quantity herein is an approximate quantity, that is, even in an absence of a specific description of "about", "around", "approximately" or "substantially", it may still imply the meaning of "about", "around", "approximately" or "substantially". In addition, the terms "range from the first value to the second value" or "range between the first value and the second value" mean that the range includes the first value, the second value and other values between them.

Although terms such as first, second, third, etc., may be used to describe diverse constituent elements, such constituent elements are not limited by the terms. The terms are used only to discriminate a constituent element from other constituent elements in the specification. The claims may not use the same terms, but instead may use the terms first, second, third, etc. with respect to the order in which an element is claimed. Accordingly, in the following description, a first constituent element may be a second constituent element in a claim.

It should be noted that the technical features in different embodiments described in the following can be replaced, recombined, or mixed with one another to constitute another embodiment without departing from the spirit of the present disclosure.

The display device of the present disclosure may include a touch display device. The touch display device may include a curved display or a free shape display, but not limited herein. The display device may be a bendable or flexible electronic device.

Figure 1B:
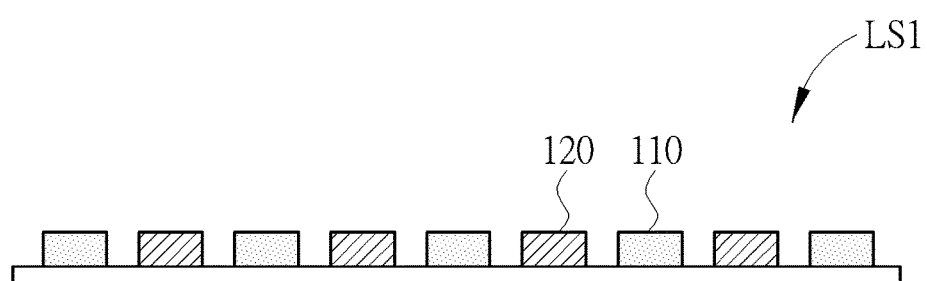
FIG. 1B is a partially enlarged schematic diagram of an embodiment of a light source group shown in FIG. 1A.
Figure 1C:
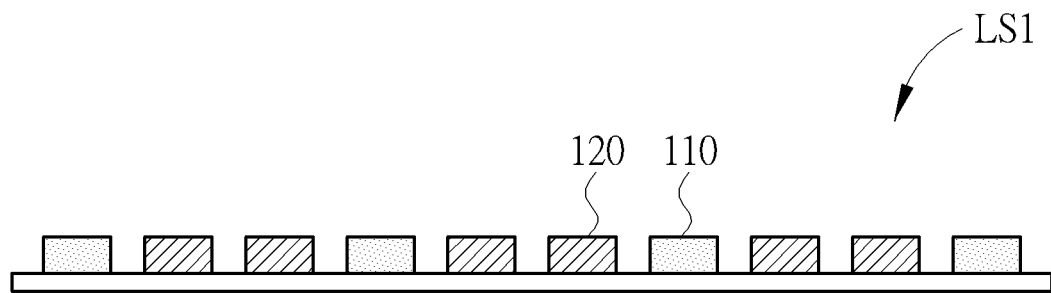
FIG. 1C is a partially enlarged schematic diagram of a variation embodiment of a light source group according to the present disclosure.
Figure 1D:
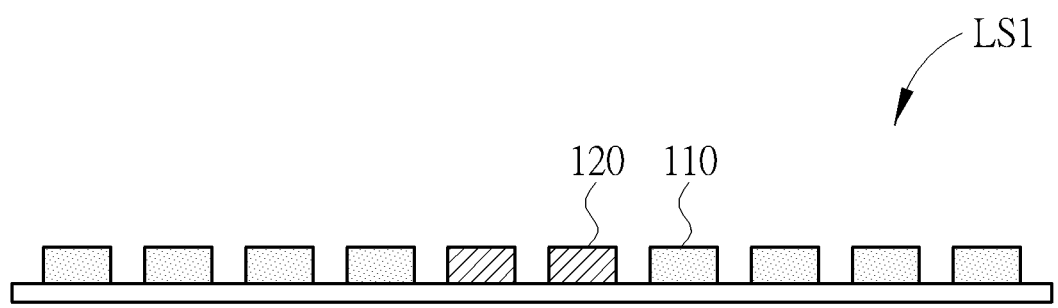
FIG. 1D is a partially enlarged schematic diagram of another variation embodiment of a light source group according to the present disclosure.
Figure 2:
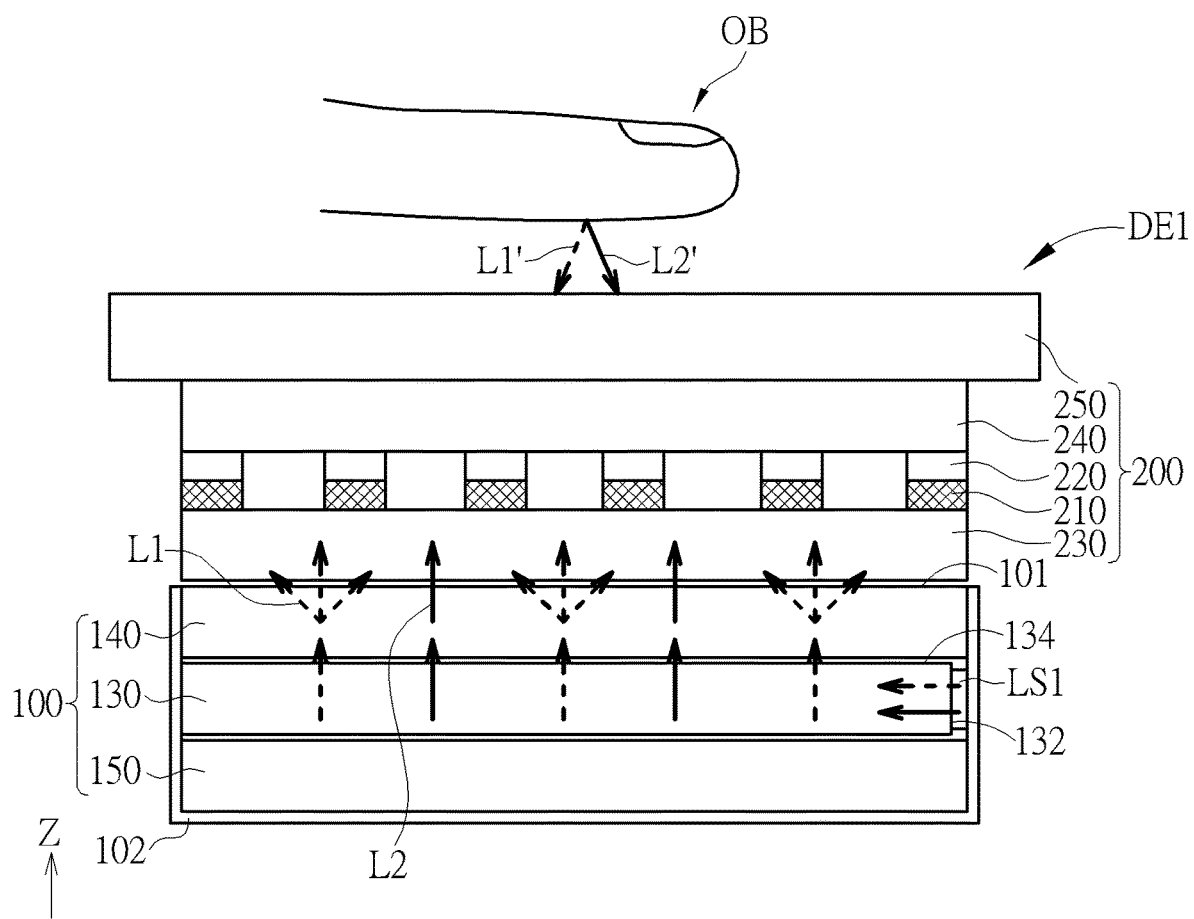
FIG. 2 is a schematic diagram of the backlight module in a second mode and the display device in a fingerprint identification mode according to the first embodiment of the present disclosure.

Please refer to FIG. 1A, FIG. 1B and FIG. 2. FIG. 1A is a schematic diagram of a backlight module in a first mode and a display device in a display mode according to a first embodiment of the present disclosure. FIG. 1B is a partially enlarged schematic diagram of a light source group shown in FIG. 1A. FIG. 2 is a schematic diagram of the backlight module in a second mode and the display device in a fingerprint identification mode according to the first embodiment of the present disclosure. As shown in FIG. 1A, FIG. 1B and FIG. 2, a backlight module 100 of the first embodiment of the present disclosure may include at least one first light emitting unit 110, at least one second light emitting unit 120, a first optical layer 130 and a second optical layer 140. The first light emitting unit 110 may emit a first light L1, the second light emitting unit 120 may emit a second light L2, and the wavelength range of the first light L1 is at least partially not overlapped with the wavelength range of the second light L2. The first light emitting unit 110 may be, for example, a light-emitting diode, but not limited herein, and the first light L1 emitted by the first light emitting unit 110 may be a visible light, wherein the wavelength range of the visible light may be, for example, 360 to 760 nanometers (nm), but not limited herein. In addition, the second light emitting unit 120 may be, for example, an infrared light-emitting diode (IR LED), but not limited herein, and the second light L2 emitted by the second light emitting unit 120 may be an infrared light, wherein the wavelength range of the infrared light may be, for example, 750 to 1400 nanometers (nm), but not limited herein. The at least one first light emitting unit 110 and the at least one second light emitting unit 120 may be integrated in a light source group LS1, and the light source group LS1 may be, for example, a light bar or a switch light bar, but not limited herein. That is to say, the light source group LS1 may include one or more first light emitting units 110 and one or more second light emitting units 120, and the configuration of the first light emitting units 110 and the second light emitting units 120 may be adjusted according to practical requirements. For example, in the light source group LS1, the first light emitting units 110 and the second light emitting units 120 may be disposed and arranged alternately, but not limited herein. Please refer to FIG. 1B. In some embodiments, as shown in FIG. 1B, the first light emitting units 110 and the second light emitting units 120 in the light source group LS1 may be, for example, arranged alternately in a manner of one first light emitting unit 110 and one second light emitting unit 120. Please refer to FIG. 1C, which is a partially enlarged schematic diagram of a variation embodiment of a light source group according to the present disclosure. As shown in FIG. 1C, the first light emitting units 110 and the second light emitting units 120 in the light source group LS1 may be, for example, arranged alternately in a manner of one first light emitting unit 110 and two second light emitting elements 120. Please refer to FIG. 1D, which is a partially enlarged schematic diagram of another variation embodiment of a light source group according to the present disclosure. As shown in FIG. 1D, the first light emitting units 110 and the second light emitting units 120 in the light source group LS1 may be, for example, arranged alternately in a manner of a plurality of first light emitting units 110 and a plurality of second light emitting units 120. The variation embodiments described above are only examples, and the design of the light source group LS1 of the present disclosure is not limited to the above configuration.

The first optical layer 130 may be disposed on a light exiting side of the first light emitting unit 110 and the second light emitting unit 120, and the first optical layer 130 may collimate the first light L1 emitted by the first light emitting unit 110 and the second light L2 emitted by the second light emitting unit 120. In some embodiment, the first light emitting unit 110 and the second light emitting unit 120 may be integrated in the light source group LS1 and correspondingly disposed on a light incident side 132 of the first optical layer 130, but not limited herein. The term "collimate" described in the present disclosure refers to concentrating the light toward one direction, so that the light substantially travels toward the same direction. In detail, compared with the light intensity of the display device without disposing the first optical layer 130, the light intensity in a specific range of viewing angle of the display device with the first optical layer 130 may be further improved, thereby achieving the collimation effect. For example, the light may be concentrated toward the direction within the range of ±10 degrees of the user's normal viewing angle direction (or called as "user's front viewing angle direction"). The user's normal viewing angle direction refers to the direction perpendicular to a light exiting side 134 of the first optical layer 130 or the normal direction of the light exiting side 134 of the first optical layer 130. Furthermore, the light intensity may be measured by, for example, optical instruments such as a color luminance meter, but not limited herein. The second optical layer 140 may be disposed on the first optical layer 130. In detail, the second optical layer 140 may be disposed adjacent to the light exiting side 134 of the first optical layer 130, and the second optical layer 140 scatters the first light L1 but does not scatter the second light L2. The term "scatter" described in the present disclosure refers to changing the traveling path of the light that travels in the same direction, so that the traveling paths of the light are not completely the same. In detail, compared with the light intensity of the first light L1 of the display device without disposing the second optical layer 140, the light intensity in a specific range of viewing angle of the first light L1 of the display device with the second optical layer 140 may be reduced, so as to achieve the demand that the second optical layer 140 scatters the first light L1, and the fingerprint identification effect is improved, but not limited herein. In some embodiments, the second optical layer 140 may be, for example, a diffuser. The diffuser may include a plurality of scattering particles, and a diameter of the plurality of scattering particles ranges from 0.03 micrometers (μm) to 3 micrometers (μm) or ranges from 0.03 micrometers (μm) to 0.3 micrometers (μm). The light with shorter wavelength is easier to encounter the scattering particles and be scattered. When the scattering of the light by the second optical layer 140 conforms to, for example, Rayleigh scattering, and the range of the diameter of the scattering particles is greater than or equal to 0.03 micrometers (μm) and less than or equal to 3 micrometers (μm), the visible light is more easily to be scattered than infrared light while encountering the scattering particles since the wavelength of the visible light (e.g., with a wavelength range of 360-830 nm) is shorter than the wavelength of the infrared light (e.g., with a wavelength range of 750-1400 nm). According to the present disclosure, by controlling the diameter of the scattering particles, the first light L1 may be scattered after passing through the diffuser, but the second light L2 will not be scattered after passing through the diffuser. For example, the visible light with short wavelength may be scattered after passing through the diffuser, but the infrared light with long wavelength will not be scattered after passing through the diffuser, thereby improving the fingerprint identification effect, but not limited herein.

Figure 3A:
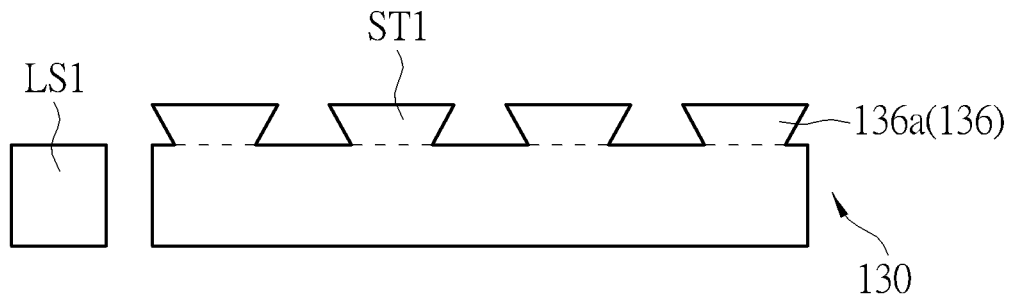
FIG. 3A is a side-view schematic diagram of an embodiment of a first optical layer according to the present disclosure.
Figure 3B:
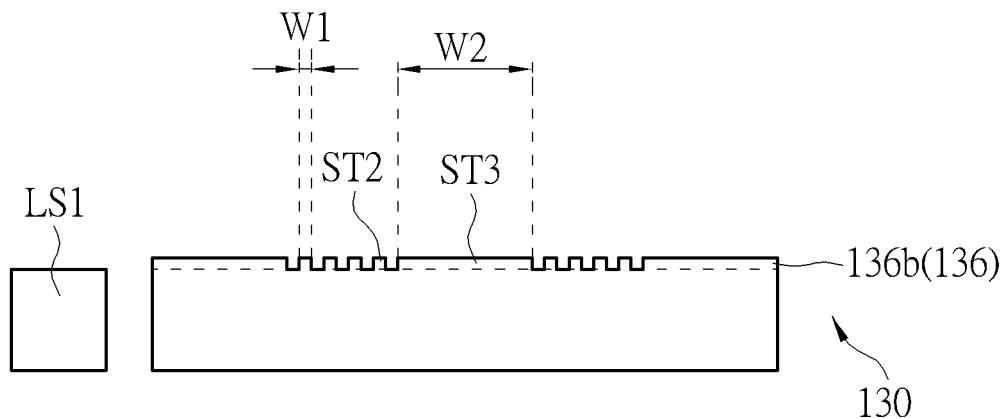
FIG. 3B is a side-view schematic diagram of a variation embodiment of a first optical layer according to the present disclosure.
Figure 3C:
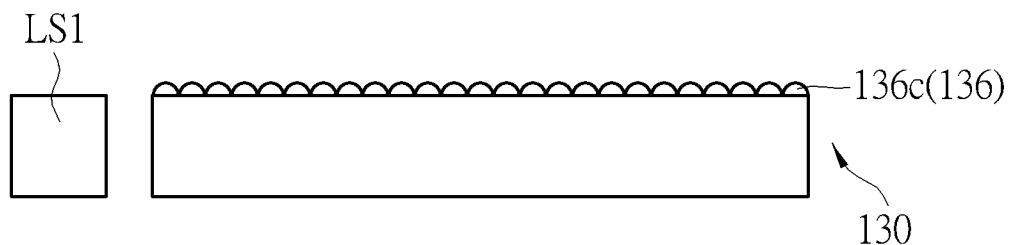
FIG. 3C is a side-view schematic diagram of another variation embodiment of a first optical layer according to the present disclosure.

In some embodiments, as shown in FIG. 1A and FIG. 1B, the light source group LS1 including the first light emitting unit 110 and the second light emitting unit 120 may be disposed on the light incident side 132 of the first optical layer 130. The light incident side 132 may be located at a side end of the first optical layer 130 and not parallel to the light exiting side 134 of the first optical layer, or the light incident side 132 may be adjacent and connected to the light exiting side 134. For example, the light incident side 132 may be located on the right side or the left side of the first optical layer 130, and the light exiting side 134 may be located on the upper side of the first optical layer 130. In detail, the light exiting side 134 may face a light exiting side 101 of the backlight module 100, but not limited herein. According to the position and configuration relationship of the light source group LS1 including the first light emitting unit 110 and the second light emitting unit 120 and the first optical layer 130, the edge-type backlight module 100 may be constructed. In addition, the first optical layer 130 may be, for example, a light guide plate, but not limited herein. Furthermore, please refer to FIG. 3A, FIG. 3B and FIG. 3C. In some embodiments, the first optical layer 130 may further include a light-concentrating layer 136 through microstructure design. The light-concentrating layer 136 may help the light to substantially travel toward the same direction, and the collimation effect of the first optical layer 130 may be further improved. That is to say, the light intensity within the range of ±10 degrees of the user's normal viewing angle direction may be improved through the design of the light-concentrating layer 136, but not limited herein. Please refer to FIG. 3A, which is a side-view schematic diagram of an embodiment of a first optical layer according to the present disclosure. As shown in FIG. 3A, the first optical layer 130 may include a light-concentrating layer 136a, and the light-concentrating layer 136a includes a plurality of light-concentrating structures ST1 arranged with intervals. The shape in the side-view or cross-sectional view of the light-concentrating structures ST1 may be a stepped-shape or a tapered-shape to form an uneven patterned surface, and the light-concentrating layer 136a may help the light to substantially travel toward the light-concentrating structures ST1. Therefore, the collimation effect of the first optical layer 130 may be improved, that is, the light intensity within the range of ±10 degrees of the user's normal viewing angle direction may be improved through the design of the light-concentrating layer 136a, but not limited herein. Please refer to FIG. 3B, which is a side-view schematic diagram of a variation embodiment of a first optical layer according to the present disclosure. As shown in FIG. 3B, the first optical layer 130 may include a light-concentrating layer 136b, and the light-concentrating layer 136b includes a plurality of light-concentrating structures ST2 and a plurality of light-concentrating structures ST3 arranged with intervals. The shape in the side-view or cross-sectional view of the light-concentrating structures ST2 and the light-concentrating structures ST3 may be a rectangle to form an uneven patterned surface. Therefore, the collimation effect of the first optical layer 130 may be improved. In detail, the light-concentrating structure ST2 has a width W1 in the direction perpendicular to the normal direction of the first optical layer 130, the light-concentrating structure ST3 has another width W2 in the direction perpendicular to the normal direction of the first optical layer 130, and the width W1 is less than the width W2, but not limited herein. The light may substantially travel toward the light-concentrating structure ST3 through the disposing of the light-concentrating structures ST2 and the light-concentrating structures ST3 in the first optical layer 130, that is, the light intensity within the range of ±10 degrees of the user's normal viewing angle direction may be improved through the design of the light-concentrating layer 136b, but not limited herein. Please refer to FIG. 3C, which is a side-view schematic diagram of another variation embodiment of a first optical layer according to the present disclosure. As shown in FIG. 3C, the first optical layer 130 may include a light-concentrating layer 136c, and the light-concentrating layer 136c includes a prism layer, such as a prism layer having a plurality of convex lenses. The light may, for example, emit in the same direction through the disposing of the prism layer with a plurality of convex lenses in the first optical layer 130, thereby improving the collimation effect of the first optical layer 130, but not limited herein. The material of the first optical layer 130 in the present disclosure may include, for example, a brightness enhancement film (BEF), an advanced structured optical composite (ASOC), a phosphor, a blue light transmitting dichroic mirror (BLT) or any combinations of the above materials, but not limited herein.

Please refer to FIG. 1A. In some embodiments, the backlight module 100 may further include a reflector 150. The reflector 150 is disposed on a side opposite to the light exiting side 134 of the first optical layer 130, that is, the reflector 150 is disposed on the side away from the light exiting side 134 of the first optical layer 130. In detail, the first optical layer 130 is disposed between the reflector 150 and the second optical layer 140, and the first light L1 and the second light L2 emitted from the first optical layer 130 may be reflected back to the first optical layer 130 by the reflector 150.

The backlight module 100 may have a first mode and a second mode. As shown in FIG. 1A, the first light emitting unit 110 is in a turned-on state and the second light emitting unit 120 is in a turned-off state when the backlight module 100 is in the first mode. At this time, the first light emitting unit 110 emits the first light L1 (e.g., a visible light) but the second light emitting unit 120 does not emit light, wherein the traveling path of the first light L1 is shown by the dashed arrow in FIG. 1A. That is to say, the first light L1 will be collimated after passing through the first optical layer 130, and then scattered after passing through the second optical layer 140, so that the first light L1 is fully scattered in the second optical layer 140. The "scattering" indicated in the present disclosure may be, for example, that the first light L1 does not present a specific exiting angle when exiting the second optical layer 140, or that the exiting angle of the first light L1 does not concentrate in a specific direction range. As shown in FIG. 2, the first light emitting unit 110 and the second light emitting unit 120 are both in the turned-on state when the backlight module 100 is in the second mode. At this time, the first light emitting unit 110 emits the first light L1 (e.g., a visible light) and the second light emitting unit 120 emits the second light L2 (e.g., an infrared light), wherein the traveling path of the first light L1 is shown by the dashed arrow in FIG. 2, and the traveling path of the second light L2 is shown by the solid arrow in FIG. 2. That is to say, the first light L1 will be collimated or concentrated after passing through the first optical layer 130, and then scattered after passing through the second optical layer 140, so that the first light L1 is scattered, without presenting a specific exiting angle or being concentrated in a specific range of exiting angle when exiting the second optical layer 140. In contrast, the second light L2 will be collimated or concentrated after passing through the first optical layer 130, and then rarely be scattered after passing through the second optical layer 140, such that the second light L2 can keep in a collimating direction to travel upward through the second optical layer 140. The definition for the second light L2 being collimated after passing through the first optical layer 130 may be referred to the aforementioned definition for the first light L1 being collimated, and will not be described redundantly herein.

The backlight module 100 may be applied to, for example, a display device. As shown in FIG. 1A, FIG. 1B and FIG. 2, the display device DE1 may include a backlight module 100 and a display panel 200, and the backlight module 100 is disposed corresponding to the display panel 200. The display device DE1 may have a display mode and a fingerprint identification mode. As shown in FIG. 1A and FIG. 1B, the display device DE1 is in the display mode when performing normal display, and at this time the backlight module 100 is in the first mode correspondingly, and the first light emitting unit 100 is in the turned-on state and the second light emitting unit 120 is in the turned-off state, so the first light emitting unit 110 emits the first light L1 (e.g., a visible light) but the second light emitting unit 120 does not emit light. The traveling path of the first light L1 is shown by the dashed arrow in FIG. 1A. That is to say, the first light L1 will be collimated after passing through the first optical layer 130, and then scattered after passing through the second optical layer 140, so that the backlight module 100 may provide a visible light source with no specific exiting angle. Through providing this backlight module 100 having the visible light with a wide range of exiting angles as a backlight source to the display panel 200, the display image of the display device DE1 may have a wide viewing angle. In some embodiments, the display device DE1 may further include a housing 102. The housing 102 has an accommodating space, and the light source group LS1 including the first light emitting unit 110 and the second light emitting unit 120, the first optical layer 130, the second optical layer 140 and the reflector 150 may be disposed in the housing 102, but not limited herein.

As shown in FIG. 2, the display device DE1 is changed from the display mode to the fingerprint identification mode when fingerprint identification is required to be performed by the display device DE1, and at this time the backlight module 100 is changed from the first mode to the second mode correspondingly. For example, the second light emitting unit 120 may be changed from the turned-off state to the turned-on state by transmitting a signal of requiring fingerprint identification to the light source group LS1 of the backlight module 100, but not limited herein. That is to say, the display device DE1 is changed to the fingerprint identification mode when performing fingerprint identification. At this time, the backlight module 100 is in the second mode, the first light emitting unit 110 and the second light emitting unit 120 are both in the turned-on state, so the first light emitting unit 110 emits the first light L1 (e.g., a visible light) and the second light emitting unit 120 emits the second light L2 (e.g., an infrared light). The traveling path of the first light L1 is shown by the dashed arrow in FIG. 2, and the traveling path of the second light L2 is shown by the solid arrow in FIG. 2. That is to say, the first light L1 will be collimated after passing through the first optical layer 130, and then scattered after passing through the second optical layer 140, so that a large angle visible light source is provided. Meanwhile, the second light L2 will be collimated after passing through the first optical layer 130, and then travels substantially in the same direction or may hardly be scattered to pass through second optical layer 140 after passing through the second optical layer 140, so that the second light L2 exits from the backlight module 100 with a small angle. After the first light L1 with no specific exiting angle and the second light L2 with a smaller exiting angle are provided to the display panel 200 by the backlight module 100, a portion of the first light L1 and a portion of the second light L2 are reflected by a to-be-measured object OB (e.g., a finger). The reflected portion of the first light L1 is the light L1', the reflected portion of the second light L2 is the light L2', and the light L2' may be used for fingerprint identification. In detail, the display panel 200 of the present disclosure may further include at least one sensing element 210 and at least one band pass filter 220, and the band pass filter 220 is disposed on one side of the sensing element correspondingly. The sensing element 210 may be, for example, a photo-sensitive sensing element, and the band pass filter 220 may, for example, include a transparent photoresist layer, but not limited herein. The band pass filter 220 may filter the reflected portion of the first light L1 (i.e., the light L1') but allow the reflected portion of the second light L2 (i.e., the light L2') to pass through, so that the reflected portion of the second light L2 is sensed by the sensing element 210. In some embodiments, the sensing element 210 may be disposed between the band pass filter 220 and the backlight module 100, and when the display panel 200 includes a plurality of sensing elements 210 and a plurality of band pass filters 220, the band pass filters 220 may be disposed on the sensing elements 210 in a one-to-one manner. The reflected portion of the first light L1 (i.e., the light L1') is scattered and has stray light, which may affect the effects of imaging of fingerprint sensing and fingerprint identification, while the reflected portion of the second light L2 (i.e., the light L2') is collimated, which is beneficial to the imaging of fingerprint sensing. Therefore, the band pass filter 220 filters the reflected portion of the first light L1 but allow the reflected portion of the second light L2 to pass through, so that the reflected portion of the second light L2 is sensed by the sensing element 210, thereby improving the effects of imaging of fingerprint sensing and fingerprint identification. However, in some embodiments, the display panel 200 may not include the band pass filter 220.

In some embodiments, as shown in FIG. 1A and FIG. 2, the display panel 200 may further include a first substrate 230 and a second substrate 240, and the sensing elements 210 and the band pass filters 220 are disposed between the first substrate 230 and the second substrate 240. For example, the sensing elements 210 may be arranged with intervals and disposed on the first substrate 230, the band pass filters 220 may be disposed on the sensing elements 210 in a one-to-one manner correspondingly, and the second substrate 240 may be disposed on the band pass filters 220, but not limited herein. The first substrate 230 may include an array substrate, and the second substrate 240 may include a color filter layer, but not limited herein. In some embodiments, the display panel 200 may also selectively include a protective layer 250 disposed on the second substrate 240. The protective layer 250 may, for example, include cover glass, and the size of the protective layer 250 may be greater than the size of the second substrate 240, but not limited herein. The term "disposed correspondingly" described in the present disclosure may refer to, for example, that two elements are at least partially overlapped or completely overlapped in a direction Z (e.g., in the normal direction of the first substrate 230).

Figure 4:
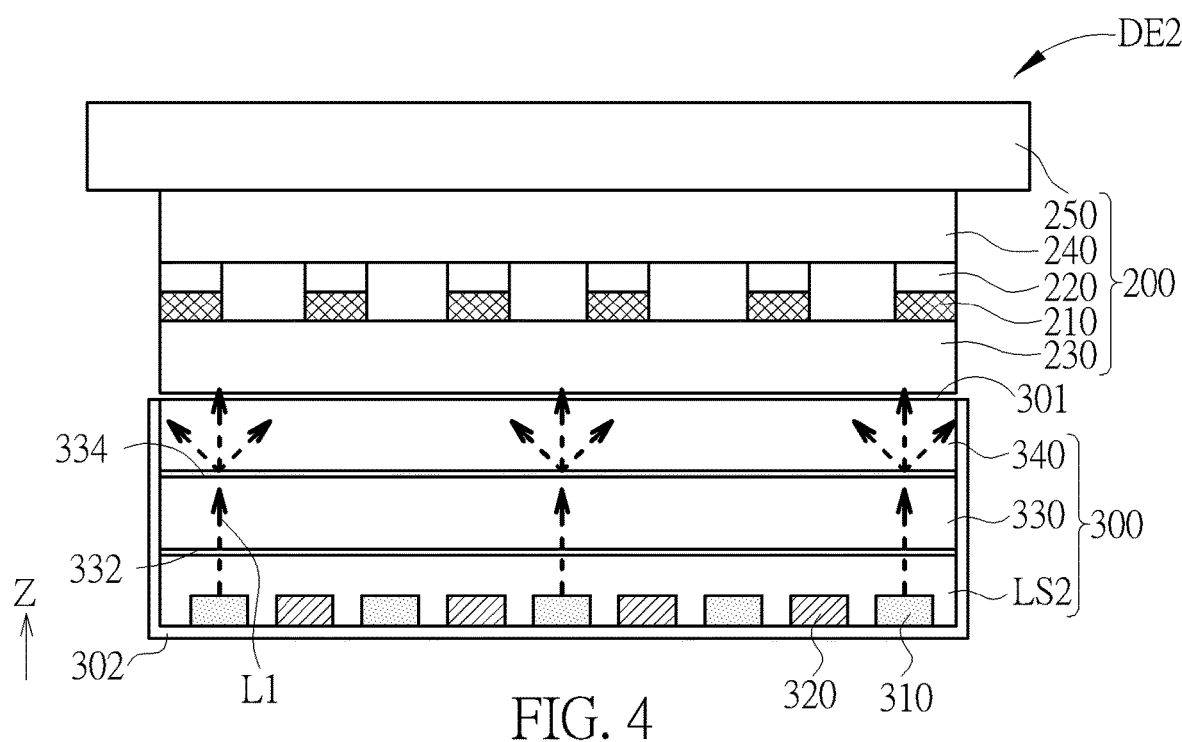
FIG. 4 is a schematic diagram of a backlight module in a first mode and a display device in a display mode according to a second embodiment of the present disclosure.
Figure 5:
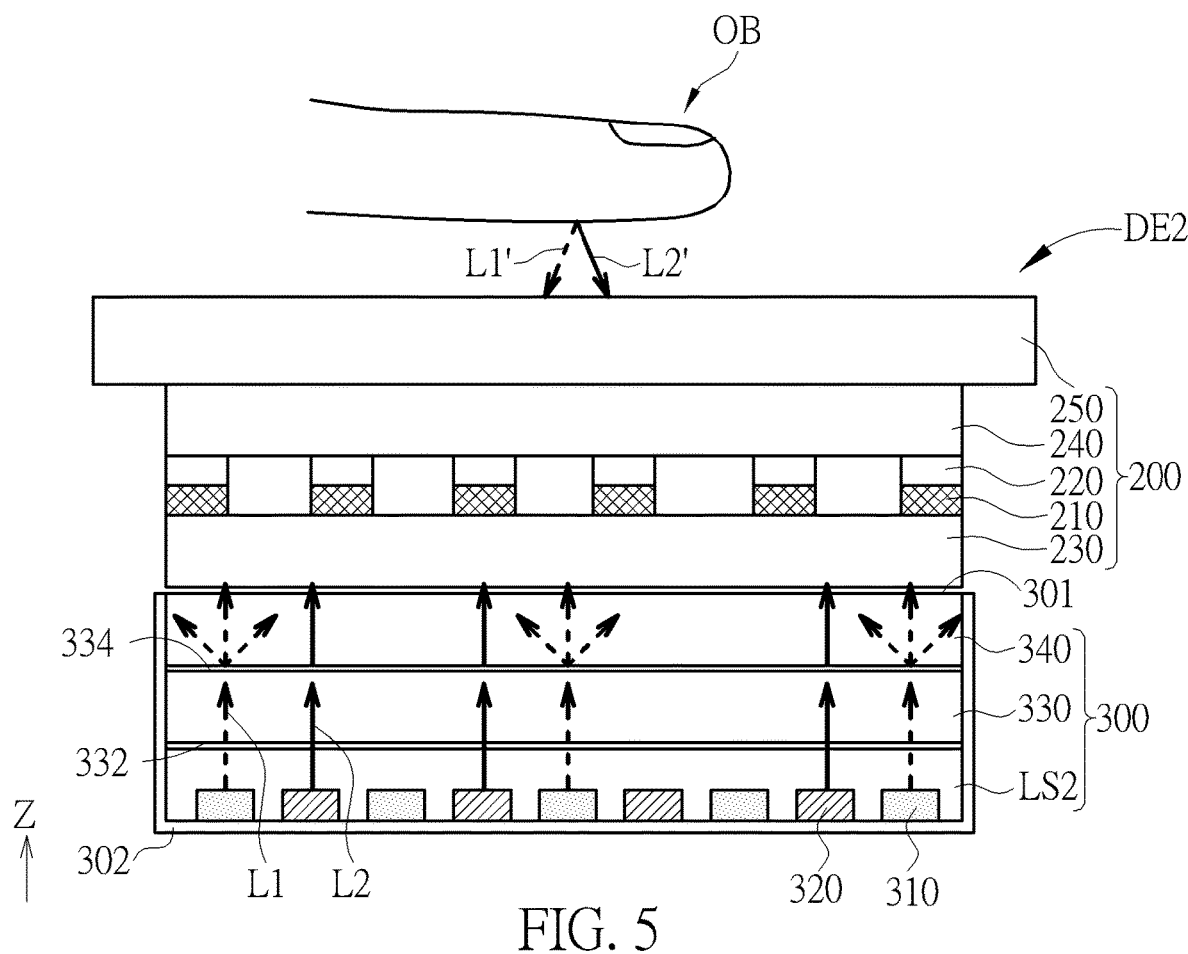
FIG. 5 is a schematic diagram of the backlight module in a second mode and the display device in a fingerprint identification mode according to the second embodiment of the present disclosure.
Figure 6A:
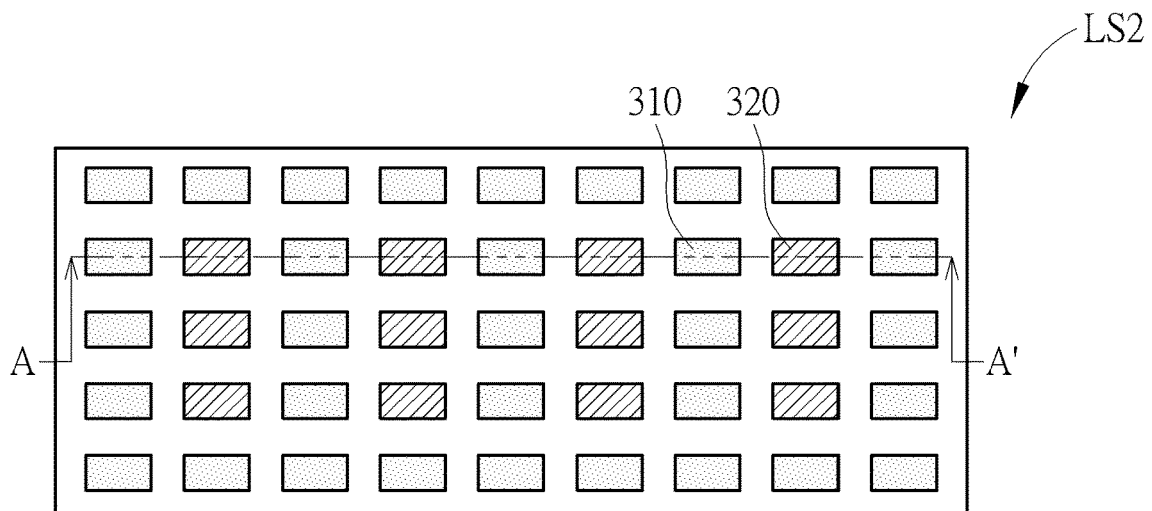
FIG. 6A is a top-view schematic diagram of an embodiment of a light source group according to the present disclosure.
Figure 6B:
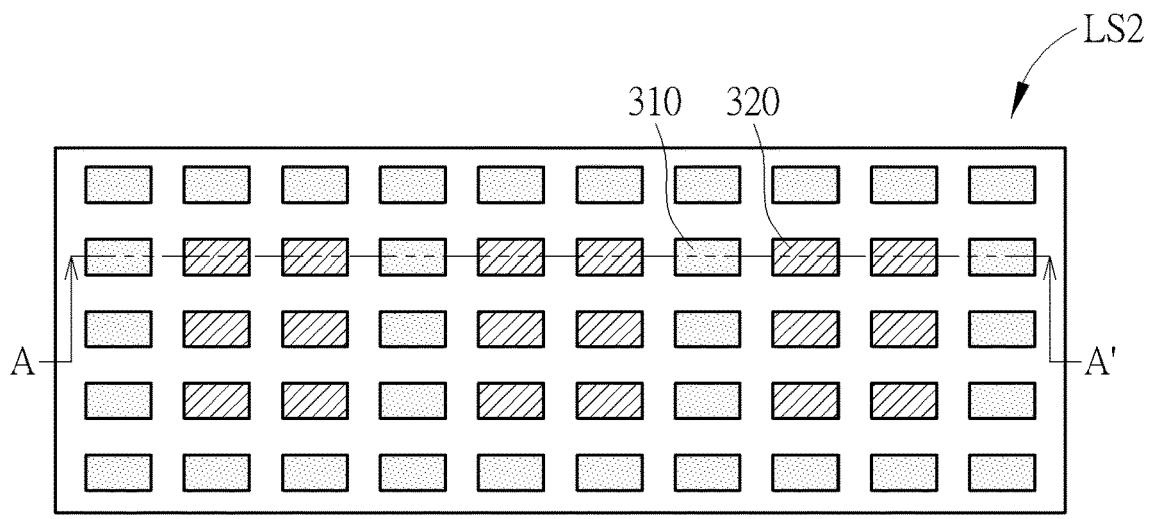
FIG. 6B is a top-view schematic diagram of a variation embodiment of a light source group according to the present disclosure.
Figure 6C:
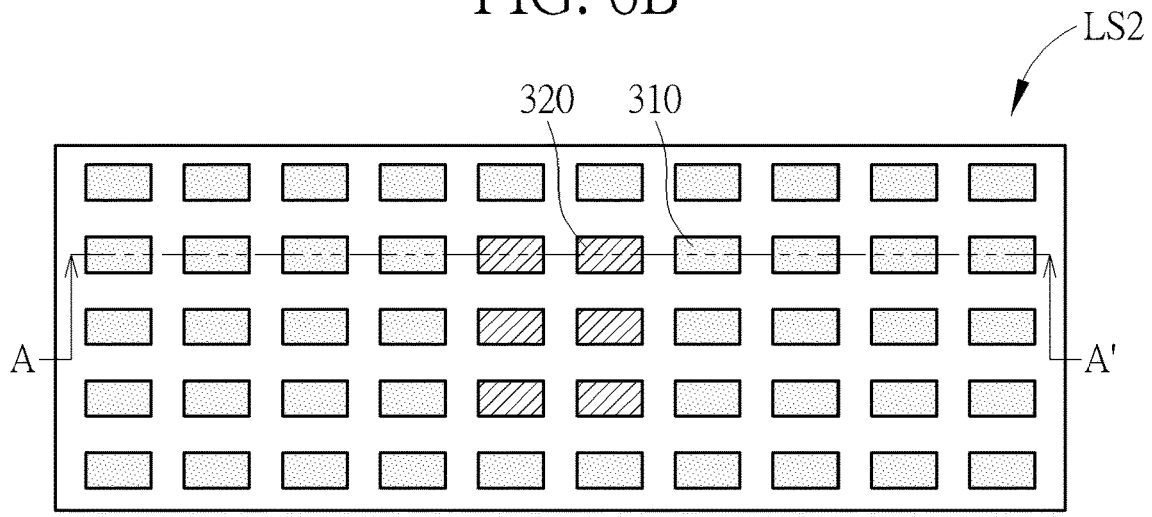
FIG. 6C is a top-view schematic diagram of another variation embodiment of a light source group according to the present disclosure.

Please refer to FIG. 4 and FIG. 5. FIG. 4 is a schematic diagram of a backlight module in a first mode and a display device in a display mode according to a second embodiment of the present disclosure. FIG. 5 is a schematic diagram of the backlight module in a second mode and the display device in a fingerprint identification mode according to the second embodiment of the present disclosure. As shown in FIG. 4 and FIG. 5, a backlight module 300 of the second embodiment of the present disclosure may include at least one first light emitting unit 310, at least one second light emitting unit 320, a first optical layer 330 and a second optical layer 340. The first light emitting unit 310 may emit a first light L1, and the second light emitting unit 320 may emit a second light L2. The at least one first light emitting unit 310 and the at least one second light emitting unit 320 may be integrated in a light source group LS2, and the light source group LS2 may be, for example, a switch light bar, but not limited herein. That is to say, the light source group LS2 may include one or more first light emitting units 310 and one or more second light emitting units 320, and the configuration of the first light emitting units 310 and the second light emitting units 320 may be adjusted according to practical requirements of products. The backlight module 300 may include one or more light source groups LS2. For example, as shown in FIG. 6A, FIG. 6B and FIG. 6C, the first light emitting units 310 and the second light emitting units 320 may be disposed on the bottom side of the first optical layer 330 (i.e., a light incident side 332 of the first optical layer 330) in a planar array manner, but not limited herein. FIG. 6A is a top-view schematic diagram of an embodiment of a light source group according to the present disclosure. As shown in FIG. 6A, in the light source group LS2, a portion of the first light emitting units 310 and the second light emitting units 320 may be arranged alternately in a manner of one column of the first light emitting units 310 and one column of the second light emitting units 320 to form a planar array, and all of the light emitting units in the peripheral portion are the first light emitting units 310, wherein the cross-sectional view of the light source group LS2 obtained along the cross line A-A' may refer to FIG. 4. Please refer to FIG. 6B, which is a top-view schematic diagram of a variation embodiment of a light source group according to the present disclosure. In the light source group LS2 of FIG. 6B, a portion of the first light emitting units 310 and the second light emitting units 320 may be arranged alternately in a manner of one column of the first light emitting units 310 and two column of the second light emitting units 320 to form a planar array, and all of the light emitting units in the peripheral portion are the first light emitting units 310, wherein the cross-sectional view of the light source group LS2 obtained along the cross line A-A' may refer to FIG. 1C. Please refer to FIG. 6C, which is a top-view schematic diagram of another variation embodiment of a light source group according to the present disclosure. In the light source group LS2 of FIG. 6C, a portion of the first light emitting units 310 and the second light emitting units 320 may be arranged alternately in a manner of plural columns of the first light emitting units 310 and plural columns of the second light emitting units 320 to form a planar array, or the second light emitting units 320 are located in the central region of the light source group LS2 and the periphery of these second light emitting units 320 is surrounded by the first light emitting units 310, wherein the cross-sectional view of the light source group LS2 obtained along the cross line A-A' may refer to FIG. 1D. The variation embodiments described above are only examples, and the design of the light source group LS2 of the present disclosure is not limited to the above configuration.

Figure 7:
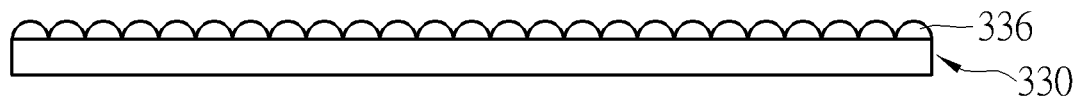
FIG. 7 is a side-view schematic diagram of another embodiment of a first optical layer according to the present disclosure.

The first optical layer 330 may be disposed on a light exiting side of the first light emitting unit 310 and the second light emitting unit 320, and the first optical layer 330 may collimate the first light L1 emitted by the first light emitting unit 310 and the second light L2 emitted by the second light emitting unit 320. In some embodiment, the first light emitting unit 310 and the second light emitting unit 320 may be integrated in the light source group LS2 and correspondingly disposed on a light incident side 332 of the first optical layer 330, but not limited herein. The second optical layer 340 may be disposed on the light exiting side 334 of the first optical layer 330, and the second optical layer 340 scatters the first light L1 but does not scatter the second light L2. The light incident side 332 of the first optical layer 330 may be opposite to the light exiting side 334 of the first optical layer 330, for example, the light incident side 332 may be substantially parallel to the light exiting side 334, and the light exiting side 334 may face a light exiting side 301 of the backlight module 300, but not limited herein. According to the position and configuration relationship of the light source group LS2 including the first light emitting unit 310 and the second light emitting unit 320 and the first optical layer 330, the direct-type backlight module 300 may be constructed. In addition, please refer to FIG. 7, which is a side-view schematic diagram of another embodiment of a first optical layer according to the present disclosure. As shown in FIG. 7, in some embodiments, the first optical layer 330 may include a light-concentrating layer 336 to improve the collimation effect of the first optical layer 330. The light-concentrating layer 336 may include a prism layer, such as a prism layer having a plurality of collimating prisms or convex lenses, but not limited herein. In some embodiments, the first optical layer 330 may further include at least one of a brightness enhancement film, an advanced structured optical composite, a phosphor and a blue light transmitting dichroic mirror, which is stacked with the light-concentrating layer 336, but not limited herein. The number and type of the stacked layers included in the first optical layer 330 may be adjusted according to practical requirements.

The backlight module 300 may have a first mode and a second mode. As shown in FIG. 4, the first light emitting unit 310 is in a turned-on state and the second light emitting unit 320 is in a turned-off state when the backlight module 300 is in the first mode, so the first light emitting unit 310 emits the first light L1 (e.g., a visible light) but the second light emitting unit 320 does not emit light, wherein the traveling path of the first light L1 is shown by the dashed arrow in FIG. 4. That is to say, the first light L1 will be collimated after passing through the first optical layer 330, and then scattered after passing through the second optical layer 340, so that the first light L1 is fully scattered in the second optical layer 340. Therefore, the first light L1 does not present a specific exiting angle when exiting the second optical layer 340, or that the exiting angle of the first light L1 does not concentrate in a specific direction range. As shown in FIG. 5, the first light emitting unit 310 and the second light emitting unit 320 are both in the turned-on state when the backlight module 300 is in the second mode. At this time, the first light emitting unit 310 emits the first light L1 (e.g., a visible light) and the second light emitting unit 320 emits the second light L2 (e.g., an infrared light), wherein the traveling path of the first light L1 is shown by the dashed arrow in FIG. 5, and the traveling path of the second light L2 is shown by the solid arrow in FIG. 5. That is to say, the first light L1 will be collimated after passing through the first optical layer 330, and then scattered after passing through the second optical layer 340, so that the first light L1 is scattered, without presenting a specific exiting angle or being concentrated in a specific range of exiting angle when exiting the second optical layer 340. In contrast, the second light L2 will be collimated after passing through the first optical layer 330, and then travel substantially in the same direction or rarely be scattered after passing through the second optical layer 340. The definition for the second light L2 being collimated after passing through the first optical layer 330 may be referred to the aforementioned definition for the first light L1 being collimated, and will not be described redundantly herein.

The backlight module 300 may be applied to, for example, a display device. As shown in FIG. 4 and FIG. 5, the display device DE2 may include a backlight module 300 and a display panel 200, and the backlight module 300 is disposed corresponding to the display panel 200. The display device DE2 may have a display mode and a fingerprint identification mode. As shown in FIG. 4, the display device DE2 is in the display mode when performing normal display, and at this time the backlight module 300 is in the first mode correspondingly, wherein the traveling path of the first light L1 is shown by the dashed arrow in FIG. 4, so that the backlight module 300 may provide a visible light source with no specific exiting angle. Through providing this backlight module 300 having the visible light with a wide range of exiting angles as a backlight source to the display panel 200, the display image of the display device DE2 may have a wide viewing angle. In some embodiments, the display device DE2 may further include a housing 302. The housing 302 has an accommodating space, and the light source group LS2 including the first light emitting unit 310 and the second light emitting unit 320, the first optical layer 330 and the second optical layer 340 may be disposed in the housing 302. The light source group LS2 including the first light emitting unit 310 and the second light emitting unit 320 is disposed between the housing 302 and the first optical layer 330 in the direction Z, but not limited herein.

As shown in FIG. 5, the display device DE2 is in the fingerprint identification mode when performing fingerprint identification, and at this time, the backlight module 300 is in the second mode, wherein the traveling path of the first light L1 is shown by the dashed arrow in FIG. 5, so as to provide a large angle visible light source, and the traveling path of the second light L2 is shown by the solid arrow in FIG. 5, so that the second light L2 exits from the backlight module 300 with a small angle. After the first light L1 with no specific exiting angle and the second light L2 with a smaller exiting angle are provided to the display panel 200 by the backlight module 300, a portion of the first light L1 and a portion of the second light L2 are reflected by a to-be-measured object OB (e.g., a finger). The reflected portion of the first light L1 is the light L1', the reflected portion of the second light L2 is the light L2', and the light L2' may be used for fingerprint identification. Since the operation modes of the display mode and the fingerprint identification mode of the display device DE2 are substantially the same as those of the display device DE1 in the aforementioned embodiments, and the components (such as the sensing element 210, the band pass filter 220, the first substrate 230, the second substrate 240 and/or the protective layer 250, etc.), the structures and the configuration relationships thereof that the display panel 200 may include have been described in detail in the aforementioned embodiments, so will not be described redundantly herein.

Figure 8:
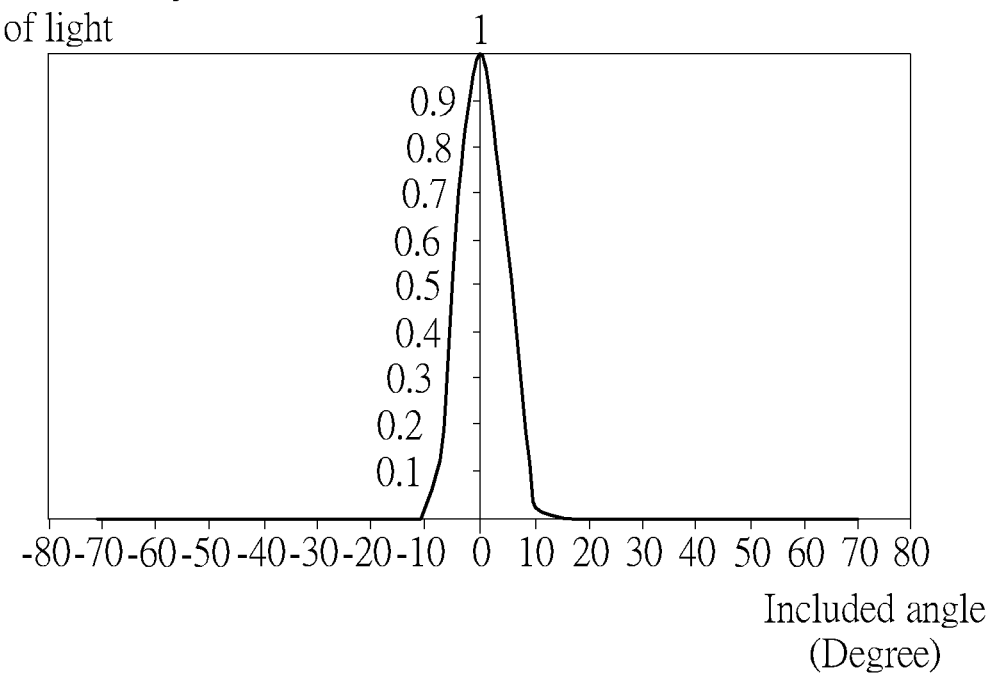
FIG. 8 is a relation chart of the light intensity and the angle of an electronic device of the present disclosure.

Please refer to FIG. 8. FIG. 8 is a relation chart of the light intensity and the angle of an electronic device (e.g., a back light module or a display device) of the present disclosure, which is used to describe the collimated light formed after the light indicated in the present disclosure is collimated. In FIG. 8, the vertical axis represents the relative intensity of light, and the light with the greatest relative intensity is defined as the strongest light. The horizontal axis represents the included angle between the traveling direction of a light and the traveling direction of the strongest light. It may be understood from FIG. 8 that, the light intensity is smaller when the included angle between the traveling direction of the light and the traveling direction of the strongest light is greater. If the relative light intensity of the strongest light is defined as 1, the included angle between the traveling direction of the light with the relative light intensity of 0.5 and the traveling direction of the strongest light is a half-value angle. For example, the half-value angle shown in FIG. 8 is about ±8 degrees, but not limited herein. The light with a half-value angle within ±10 degrees may be defined as a collimated light, and the light with a half-value angle greater than ±10 degrees may be defined as a non-collimated light or a scattered light. In addition, it may also be understood from FIG. 8 that if the half-value angle is greater than ±10 degrees, the light intensity will decrease to substantially close to 0.

It may be understood that, the relation chart between the light intensity and the angle may be referenced for example for the description of the present disclosure that the first light L1 will be collimated after passing through the first optical layer 130 and then scattered after passing through the second optical layer 140, so that the first light L1 is scattered, without presenting a specific exiting angle or being concentrated in a specific range of exiting angle when exiting the second optical layer 140. Therefore, it is known that the half-value angle of the first light L1 after passing through the first optical layer 130 is less than the half-value angle of the first light L1 after passing through the second optical layer 140. The half-value angle of the first light L1 after passing through the first optical layer 130 may be, for example, ±12 degrees, ±15 degrees, ±18 degrees or ±20 degrees, but not limited herein.

From the above description, according to the backlight module and the display device using the same of the embodiments of the present disclosure, the backlight module and the display device may have different modes based on the use situation by disposing the first light emitting unit emitting the first light and the second light emitting unit emitting the second light and cooperating with the optical characteristics of the first optical layer and the second optical layer. Furthermore, through collimating the first light and the second light by the first optical layer, and scattering the first light but not scattering the second light by the second optical layer, the display image may be viewed from a wide viewing angle when the display device is in a display mode, and the effects of imaging of fingerprint sensing and fingerprint identification may be improved when the display device is in a fingerprint identification mode.

Those skilled in the art will readily observe that numerous modifications and alterations of the device and method may be made while retaining the teachings of the disclosure. Accordingly, the above disclosure should be construed as limited only by the metes and bounds of the appended claims.

What is claimed is:

1. An electronic device, comprising:
a first light emitting unit emitting a first light;
a second light emitting unit emitting a second light;
a first optical layer, wherein at least one of the first light and the second light passes through the first optical layer; and
a second optical layer overlapped with the first optical layer,
wherein the second optical layer is configured to scatter the first light emitted from the first light emitting unit,
wherein the electronic device has a first state and a second state, the first light emitting unit emits the first light and the second light emitting unit does not emit the second light when the electronic device is in the first state, and the first light emitting unit emits the first light and the second light emitting unit emits the second light when the electronic device is in the second state.

2. The electronic device according to claim 1, wherein the first optical layer comprises a collimating layer.

3. The electronic device according to claim 2, wherein the first optical layer comprises a brightness enhancement film.

4. The electronic device according to claim 1, wherein the first optical layer comprises a light guide plate.

5. The electronic device according to claim 4, wherein at least one of the first light emitting unit and the second light emitting unit is disposed on a side of the light guide plate.

6. The electronic device according to claim 1, further comprising a display panel disposed on the second optical layer.

7. The electronic device according to claim 6, wherein the display panel comprises a protective layer.

8. The electronic device according to claim 7, wherein the second optical layer is disposed between the first optical layer and the protective layer.

9. The electronic device according to claim 1, further comprising a housing, and the first light emitting unit is disposed in the housing.

* * * * *